United States Patent
Muchalov

(10) Patent No.: US 6,843,459 B2
(45) Date of Patent: Jan. 18, 2005

(54) TURNTABLE FOR PRODUCTION LINE APPLICATIONS

(76) Inventor: Ivan Muchalov, R.R. No. 1, Erin, Ontario (CA), N0B 1T0

(*) Notice: Subject to any disclaimer, the term of this patent is extended or adjusted under 35 U.S.C. 154(b) by 82 days.

(21) Appl. No.: 10/223,276

(22) Filed: Aug. 20, 2002

(65) Prior Publication Data

US 2004/0035314 A1 Feb. 26, 2004

(51) Int. Cl.⁷ .............................................. A47B 91/00
(52) U.S. Cl. ....................... 248/349.1; 248/678; 104/44
(58) Field of Search ........................ 248/349.1, 346.06, 248/346.05, 651, 678; 108/20, 139; 104/44, 46, 38, 36, 35

(56) References Cited

U.S. PATENT DOCUMENTS

| | | | | |
|---|---|---|---|---|
| 816,620 A | * | 4/1906 | Turner | 104/44 |
| 1,089,582 A | * | 3/1914 | Noble | 104/44 |
| 1,200,148 A | * | 10/1916 | Stevens | 104/44 |
| 1,417,384 A | * | 5/1922 | Imler | 104/41 |
| 1,421,008 A | * | 6/1922 | Inman | 104/38 |
| 1,784,554 A | * | 12/1930 | Stukenborg | 254/93 L |
| 2,414,573 A | * | 1/1947 | Wagner et al. | 212/253 |
| 2,967,045 A | * | 1/1961 | Axman | 254/421 |
| 3,566,798 A | * | 3/1971 | Peitzman | 104/44 |
| 3,854,404 A | * | 12/1974 | Janda | 104/44 |
| 4,753,173 A | | 6/1988 | James | |
| 5,129,170 A | * | 7/1992 | Fusilli | 37/231 |
| 5,149,043 A | | 9/1992 | Grundmann | |
| 5,626,079 A | * | 5/1997 | Summers | 104/44 |
| 5,749,304 A | * | 5/1998 | Turner | 108/20 |
| 5,749,556 A | | 5/1998 | Matsuoka et al. | |
| 5,755,160 A | * | 5/1998 | Blufordcraving | 104/36 |
| 5,765,796 A | * | 6/1998 | Lanus | 248/349.1 |
| 6,041,500 A | | 3/2000 | Terpstra | |
| 6,148,568 A | * | 11/2000 | Beasley | 52/65 |
| 6,470,807 B2 | | 10/2002 | Warner | |
| 6,530,550 B1 | | 3/2003 | Knighton et al. | |
| 6,672,221 B2 | * | 1/2004 | Hadley | 104/35 |
| 2003/0056682 A1 | | 3/2003 | Hill | |

* cited by examiner

*Primary Examiner*—Korie Chan
(74) *Attorney, Agent, or Firm*—Marks & Clerk

(57) ABSTRACT

A turntable for production line applications is provided which is suitable for large surface area applications, such as, for example, in the production of automobiles. The turntable has an annular platform surface around a central vertical structure which houses a vertically orientated drive motor. The platform is preferably supported at its outer edge by a series of rollers or casters, and is supported at its inner edge by a ring bearing. By providing a vertically orientated motor in the central structure, more useable space on the turntable is provided. In addition, the turntable is more easily maintained, and is less prone to accidental damage. As such, a turntable of improved overall efficiency is provided.

31 Claims, 5 Drawing Sheets

TURNTABLE FOR PRODUCTION LINE APPLICATIONS

FIELD OF THE INVENTION

The present invention relates to the field of production line equipment, and in particular, relates to a turntable which can be used in, for example, the production line assembly of automobiles.

BACKGROUND OF THE INVENTION

Turntables are commonly used on productions lines of various types in order to, for example, allow different tasks to be performed on related items within a given space. For example, a turntable could be used to allow workers to hand fill a empty rack at one station of a turntable, while a fork lift is used at a second station on the turntable to remove filled racks, and replace them with empty racks. As such, the worker is kept safely away from the fork lift, and can be actively filling a rack while the fork lift is occupied with removal of the filled rack, or the like. Once an empty rack has been filled, the turntable would be turned 180°, for a two-station turntable, so that the workers are presented with a new empty rack, and the fork lift would have easy access to remove the filled rack and replace it with an empty rack.

Turntables are used in a variety of applications, and can be of a variety of different sizes. The number of stations on the turntable can vary but is typically 4 or less. After each loading or unloading cycle, for example, is complete, the turntable would be turned an appropriate amount, in order to move the work product to the next station.

Turntables can be of any suitable size depending on the part size, and depending on the operation to be preformed. In some automotive applications, the size of the turntable can be relatively large. For example, a two station automotive turntable can be over 5 meters in diameter, while a three station automotive turntable can be over 7 meters in diameter. These devices are commonly made of steel in order to support the weight of the work product and, as such, rotation of the turntable can made difficult by the weight of the work product and the weight of the turntable itself.

Commonly, the turntable is supported by a series of rollers or the like under the turntable "floor" structure, and the turntable is turned using a motorized, belt or chain-driven connection to a gear structure which acts on the outer edge of the turntable. This arrangement can lead to wear and/or adjustment difficulties with the drive system and can lead to control problems as the turntable is rotated. Also, motorized, frictional drive systems are known where a drive wheel presses against the turntable, but these suffer from the constant need for adjustment of the frictional drive.

Drive systems are also known which use a horizontal motor located at or near the centre of the turntable structure but which are located on the floor or other support structure so as to be stationary, and connect to the central opening of an annular turntable using a frictional connection, or by using a pinion gear connected to a gear structure located on the inner annular surface of the turntable. However, in these devices, the motor and gear structure requires a significant amount of space and thus reduces the amount of space available for use on the turntable. Further, the gear structure is typically exposed and it is possible to inadvertently damage the gear structure.

Commonly, the floor of the turntable is round in overall shape, but is typically made of a collection of square plates which have been cut for this purpose. As such, the individual floor plates may be different from each other, and it can be difficult to fit the floor plates together in an apparent seamless configuration, particularly after installation and during use of the turntable structure. This is particularly true as the turntable is rotated and the support structure acts on different turntable plates. As such, the floor of the turntable may be uneven, and may contain vertical or horizontal gaps, or non-level sections which can make walking or movement of equipment on the turntable, difficult or unsafe. This is a particularly significant disadvantage in automated operations wherein "robotic" or other such devices travel across the turntable surface and the uneven floor can interfere with the movement of these robotic devices.

To overcome these difficulties, it would be advantageous to provide a turntable suitable for larger applications which provides a better support arrangement, allows for a common floor plate structure, avoids the difficulties of chain-driven, belt or frictional movement mechanisms, and facilitates the provision of a level floor structure in order to avoid vertical or horizontal gaps in the floor.

SUMMARY OF THE INVENTION

Accordingly, it is a principal advantage of the present invention to provide a turntable, and in particular, a turntable for production applications, which avoids or at least partially mitigates the disadvantages of prior art turntables.

It is a further advantage of the present invention to provide a turntable for automotive production, which has a smooth, platform surface, and which platform surface can be easily repaired and/or maintained, and is comprised of essentially identical, replaceable panels.

The advantages set out hereinabove, as well as other objects and goals inherent thereto, are at least partially or fully provided by the turntable of the present invention, as set out herein below.

Accordingly, in one aspect, the present invention provides a turntable for production line applications which turntable is rotatable about a central vertical axis, and which comprises:

a platform having an inner edge and an outer edge and preferably being annular in shape and essentially flat;

an outer support preferably comprising a plurality of roller means underneath said platform, at or near the outer edge of said platform;

a inner support for supporting said platform at or near said inner edge of said platform, such that said platform is essentially supported by said outer and said inner supports; and a central structure at or near said central vertical axis, comprising a vertical central support to which an inner edge of said platform is attached, a motor support located inside said central support and fixed to a stationary support, a vertical motorized drive section supported by said motor support, and a connector which connects said drive section to said central support.

In a further aspect, the present invention also provides the use of a turntable as described hereinabove with respect to the present invention, in a production line application, and in particular, to the use of such a turntable in the production of an automobile or in the production of automobile parts.

DETAILED DESCRIPTION OF THE INVENTION

The present application is primarily directed to the design and use of a turntable, and to its use in a production line application, and most particularly, in an automotive production line application. However, the skilled artisan will be aware that such turntables can be commonly used in a wide variety of applications. Accordingly, while the present application is described with particular reference to the automotive industry, the skilled artisan would be aware that the present application is equally applicable in other non-automotive applications. In the present application, the term "turntable" refers to a movable platform, which can be rotated about a central axis. The platform is preferably flat, and is preferably circular in overall construction. However, any suitable shape might be used, such as, for example, a square or octagon turntable, however, a circular turntable typically requires the least amount of floor space.

As such, the turntable of the present invention is preferably an essentially flat platform. The platform is also preferably an annular surface which has a circular outer edge. The diameter of the platform is preferably such that a large area is covered, and by this is meant that the turntable has a diameter of at least 1 meter, and more preferably is between 3 and 10 meters in diameter, and most preferably is between 5 and 8 meters in diameter.

For example, a large area turntable with a diameter of 5 meters might be capable of holding 2 or more automobile frames, and as such, is significantly larger than smaller industrial turntable configurations.

The central structure of the turntable provides for a minimal use of turntable area since the motor and optional gearing and the like, are vertically aligned and are housed within a vertical structure. As such, the central structure has a "footprint" which is less than 15% of the total overall turntable area, more preferably less than 10% of the total turntable area, and most preferably, has a footprint of less than 5% of the total turntable area. It will be apparent to those skilled in the art that the size of the motor, and thus the minimum size of the motor support and central support, will vary depending on the size and weight of the turntable, and the products to be placed on the turntable.

The turntable, and in particular, the central structure, is preferably positioned on a floor structure located on or near a production line facility. The floor structure can then act as a stationary support for the motor support.

The supports for the turntable consists of at least two different components. First, an outer support is provided which is positioned underneath the platform at or near the outer edge of the platform. The outer support can comprise a series of support arms extending from the inner support of the turntable, but more preferably is a plurality of rollers or casters located at or near the outer surface of the turntable, and on which the platform will roll as the turntable is rotated. Preferably, the casters are connected to a caster ring which ring can be affixed to the floor structure in order to position the casters at the outer edge of the platform. The casters are preferably individually adjustable in height, using for example, a threaded height adjustment, so that the outer edge of the platform can be leveled to a predetermined height.

Once the caster heights have been set, the platform can be set into place so as to provide a flat floor structure free from gaps or vertical movements as the turntable is rotated.

An inner support is provided which is preferably located at or near the inner edge of the annular platform. A preferred type of inner support is a circular ring bearing having a fixed section affixed to a ring bearing support which is in turn, directly or indirectly affixed to the floor structure, and a rotatable annular ring bearing section which is affixed to the inner edge of the platform.

When supported by the inner and outer supports, the floor area of the platform of the turntable is essentially completely supported and provides a floating deck structure which can be readily moved by the motorized drive section.

The inner and outer supports typically act to raise the platform above floor level. Preferably, however, at least part of platform is essentially level with adjacent floor structure in order that, workers can move easily from the floor section onto the platform without a tripping hazard. This can be accomplished by providing a raised floor structure adjacent to the turntable, or by sinking the support structure for the platform beneath floor level such that the upper level of the platform is essentially level with the floor. On the opposite side of the platform, in a two station embodiment, a fork lift can approach the turntable, and can drop empty or full racks onto the platform, and/or remove racks, or the like as required, without approaching the workers on the other side of the platform.

In situations where a raised section of floor is provided adjacent to, and level with only part of the platform, a guard section can optionally be fitted around the platform in order to prevent accidental contact of the tines of the fork lift with the turntable support structure. Preferably, the guard is sloped so as to deflect the tines of the fork lift so as to minimize damage to the turntable or to the turntable supports.

The central structure has a series of components including a vertical central support which preferably is a vertical cylinder which extends above the turntable platform and which is co-axial with the central vertical axis. The central support is attached, preferably at a lower end of the vertical cylinder, to the platform of the turntable so that rotation of the central support results in rotation of the turntable.

Inside the central support is a motor support which preferably is a second vertical cylinder which is also co-axial with the central vertical axis. The motor support is fixed into a set position on a stationary support, which stationary support is preferably directly or indirectly supported by the floor structure.

The motorized drive section used to turn the turntable, includes a motor and any other optional components such as gear boxes, differentials, fluid couplings and the like, all of which are preferably supported by the motor support. Also, preferably all components of the motorized drive section are essentially completely contained within the motor support. In a preferred design, the motor and any gear boxes or the like, are aligned so as to be co-axial with the central vertical axis.

The output shaft from the motorized drive section is connected to the central support using a connector. While the connector may simply be a direct link between the output shaft of the motorized drive section and the central support, it preferably comprises a flexible, elastomeric, or resilient coupling. This could include a misalignment coupling which would allow for some small misalignment of the motor output shaft.

The connector is preferably located at or near the top of the central support and at or near the top of the motor support. In this fashion, the motorized drive section is completely housed within the central support, and where the central support is a solid cylinder, access to the motorized drive section is limited. Access doors on the central support and the motor support can be provided to allow access to the motorized drive section, however.

In a preferred embodiment of the turntable of the present invention the central structure comprises: i) a central support of a vertical cylinder having an upper open end and a lower open end, the edge of said lower open end being affixed to the inner edge of said platform; ii) a motor support of an inner vertical cylinder within said inner vertical support having a lower end opening, the edge of which is attached directly or indirectly to said supporting floor structure; iii) a vertically aligned motor as part of said motorized drive section, preferably essentially contained within said inner vertical cylinder and connected to said motor support; iv) a drive transfer connector which connects an output shaft of said motorized drive section to said outer vertical cylinder, wherein rotation of said output shaft of said motorized drive section results in rotation of said outer vertical cylinder, and thus results in rotation of said platform.

Preferably, the axis of the motor, a gear section, and/or the output drive shaft from the motor or gear section of said motorized drive section, are all essentially aligned along the central vertical axis of said turntable.

All components of the turntable of the present invention can be manufactured from a variety of materials provided that adequate strength is provided. This can include plastics, wood, concrete, ceramics, glass, ferrous or non-ferrous metals, and the like, or combinations of these materials. However, preferably the turntable is primarily made of steel.

In a particularly preferred embodiment, the platform is manufactured from a series of truncated "pie-shaped" pieces which extend radially from a central portion of the annular platform. These "pie-shaped" pieces are preferably essentially identical, or comprise a series of consistent modification such that the platform can be constructed from a series of two or three sets of identical panel sections.

In particular, at least some of the pie-shaped panel sections have one or more optionally closable openings, through which, access to the underlaying support structure is possible in order to perform routine maintenance or repair.

Also, the pie-shaped elements can be manufactured so that they cover a standard radial angle. As such, all or part of the turntable can be extended or contract by inserting a new pie-shaped element which is longer or shorter than the standard element. In this fashion, for example, a 3 meter turntable could be readily converted to a 4 meter turntable by replacement of the pie-shaped elements without the need for any modification of the central structure.

Also, the "component" nature of the turntable of the present invention allows for easy of transport and assembly in that a central section could be shipped and the outer support and radial pie-shaped floor elements added to the central section.

When the turntable of the present invention is assembled and used, it can be easily rotated to any desired position. Commonly, the turntable will support a rack station wherein, for example, automotive parts can be loaded or unloaded onto a rack on one side of the turntable, and the rack removed by a fork lift on another section of the turntable. The removed rack can then be replaced with an empty rack. Typically, however, the turntable has at least two rack stations, and thus will rotate (and preferably automatically rotate) through a turn cycle of 180° each time a rack is full, for example. For turntable with three rack stations, a turn cycle of 120° would be used. The turn cycle can thus be selected to provide the necessary turn required for the number of "stations" contained on the turntable.

Also, it should be noted that while a circular, or annular configuration is most preferred, other design shapes could be used, such as for example, a square vertical "cylinder" might be used in place of a circular cylinder, without departing from the teachings of the present invention. Similarly, other shapes could be used for different items provided that suitable design amendments are made.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
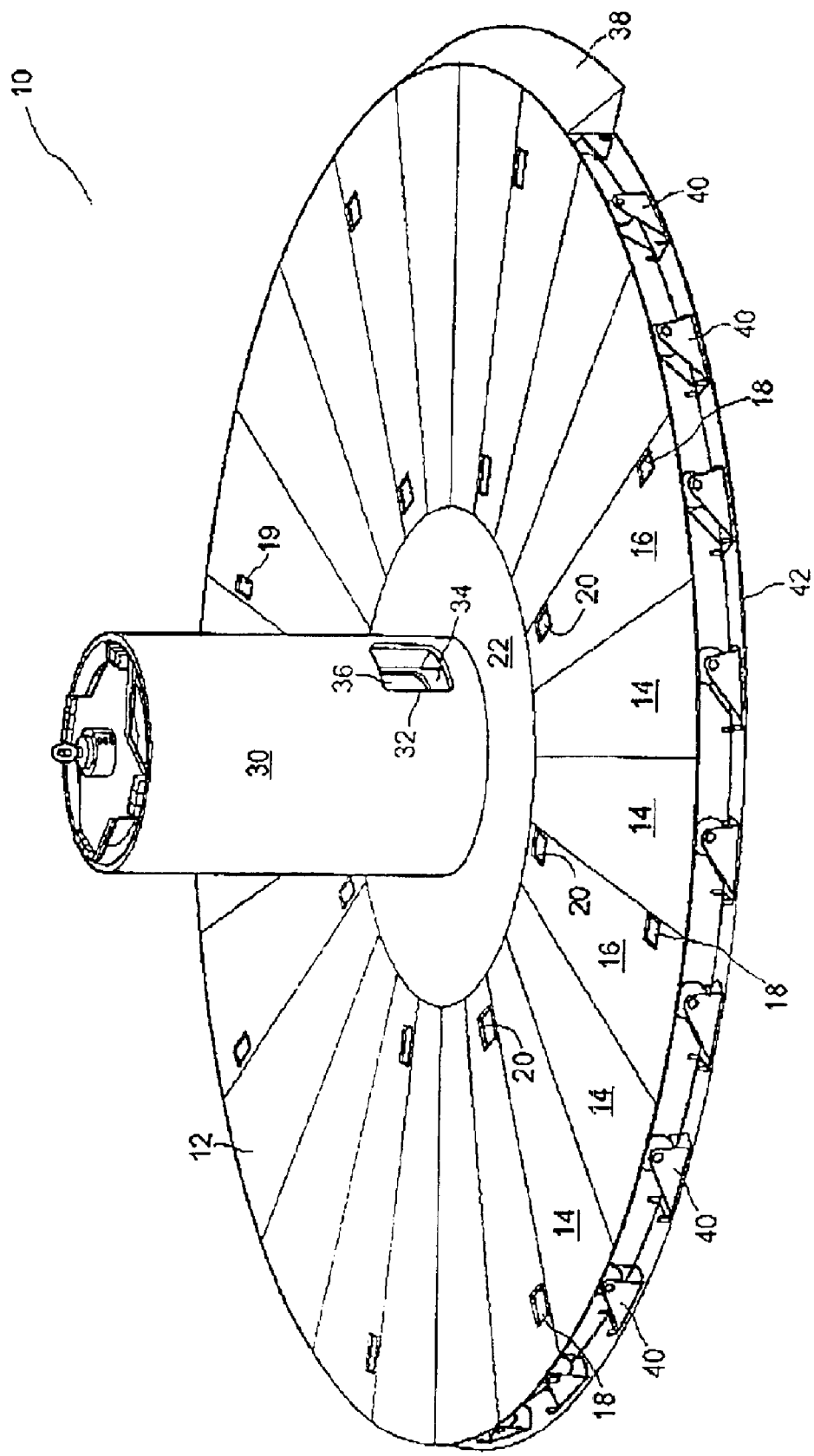
FIG. 1 is a perspective view of a turntable constructed in accordance with one preferred embodiment of the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Referring to FIG. 1, a turntable 10 is shown having a platform 12 constructed primarily of two different types of truncated pie-shaped pieces 14 and 16. Pieces 16 differ from pieces 14 in that they include two access holes 18 and 20 for accessing components of the support structure of the turntable for repair or maintenance. Some of access holes 18 and 20 are shown without covers, but in normal use, covers 19 would be provided for all access holes.

Platform 12 also comprises a annular connection section 22 to which pieces 14 and 16 are connected. Section 22 is attached to vertical central support cylinder 30. Vertical support cylinder 30 has a motor access opening 32 (which would normally be equipped with a cover—not shown—to control access). Through opening 32, a portion of vertical motor support cylinder 34 is shown, which also has a second motor access opening 36. For motor maintenance, platform 12 would be rotated so that access opening 32 was in alignment with access opening 36.

The outer edge of platform 12 rests on a series of casters 40, which act as rollers. Each caster 40 is affixed to a caster support ring 42, and each caster 40 is individually adjustable for height, position or the like. Access to casters 40 can be provided through access holes 18 on panels 16.

In situations where all of platform 12 is not essentially level with the adjacent floor, a guard 38, would be positioned adjacent to the edge of platform 12 in order to prevent the tines of a fork lift from accidentally contacting casters 40, or from getting caught under platform 12. Guard 38 is angled upwards so that it will bounce the tines of the fork lift upwards, if needed.

Figure 2:
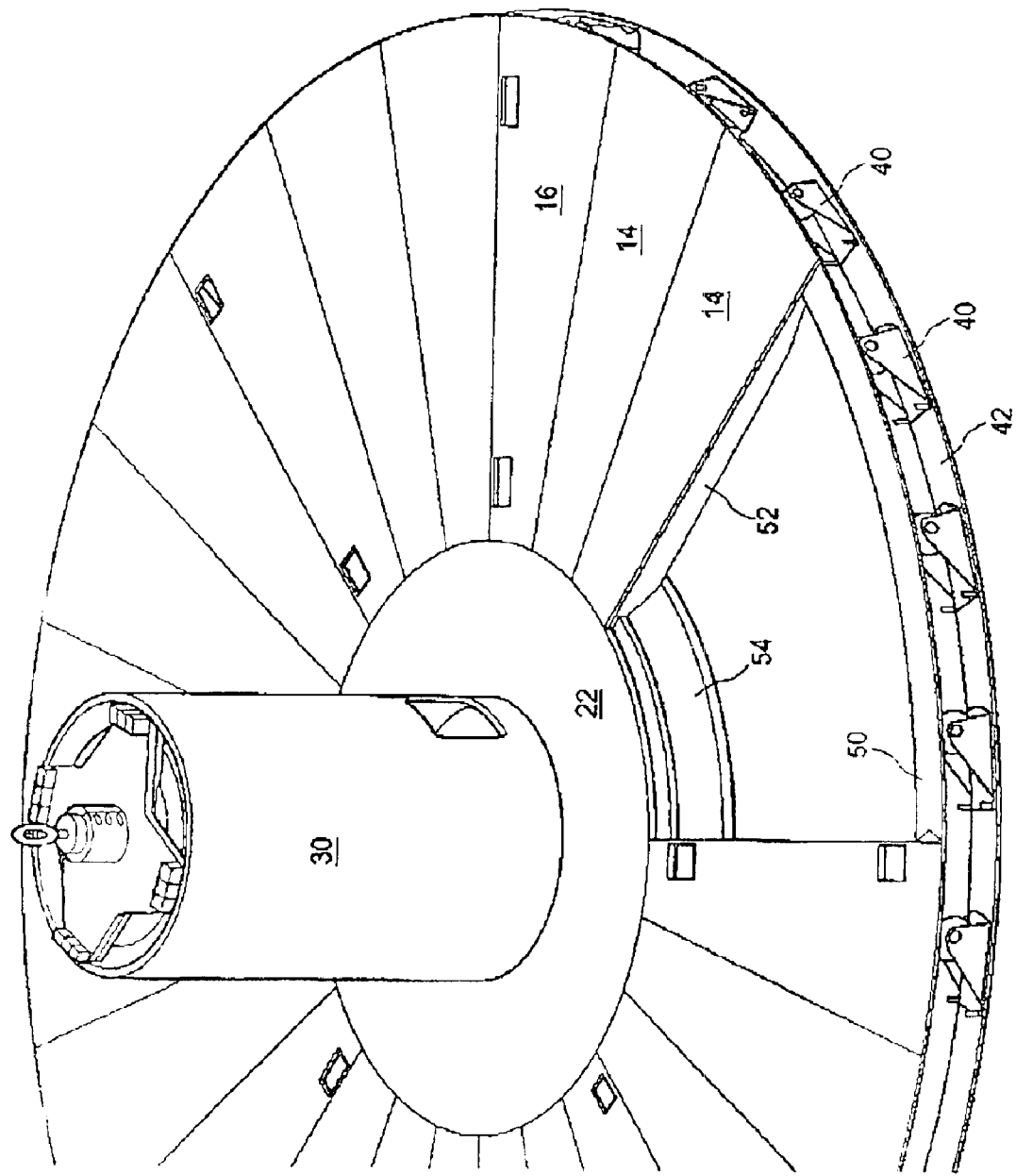
FIG. 2 is a partial view of a section of the turntable of FIG. 1.

Additional details of construction can be seen in FIG. 2 which is a perspective view of part of the turntable 10 of FIG. 1, wherein a series of platform panels 14 and 16, have been removed. The additional details of construction seen in the resulting opening include a platform support ring 50 to which the platform is attached, and which will rest on casters 40.

Also shown is a platform support arm 52 which extends radially from annular section 22 to support ring 50. Also shown is support base 54 which is used to support the central components of turntable 10.

Figure 3:
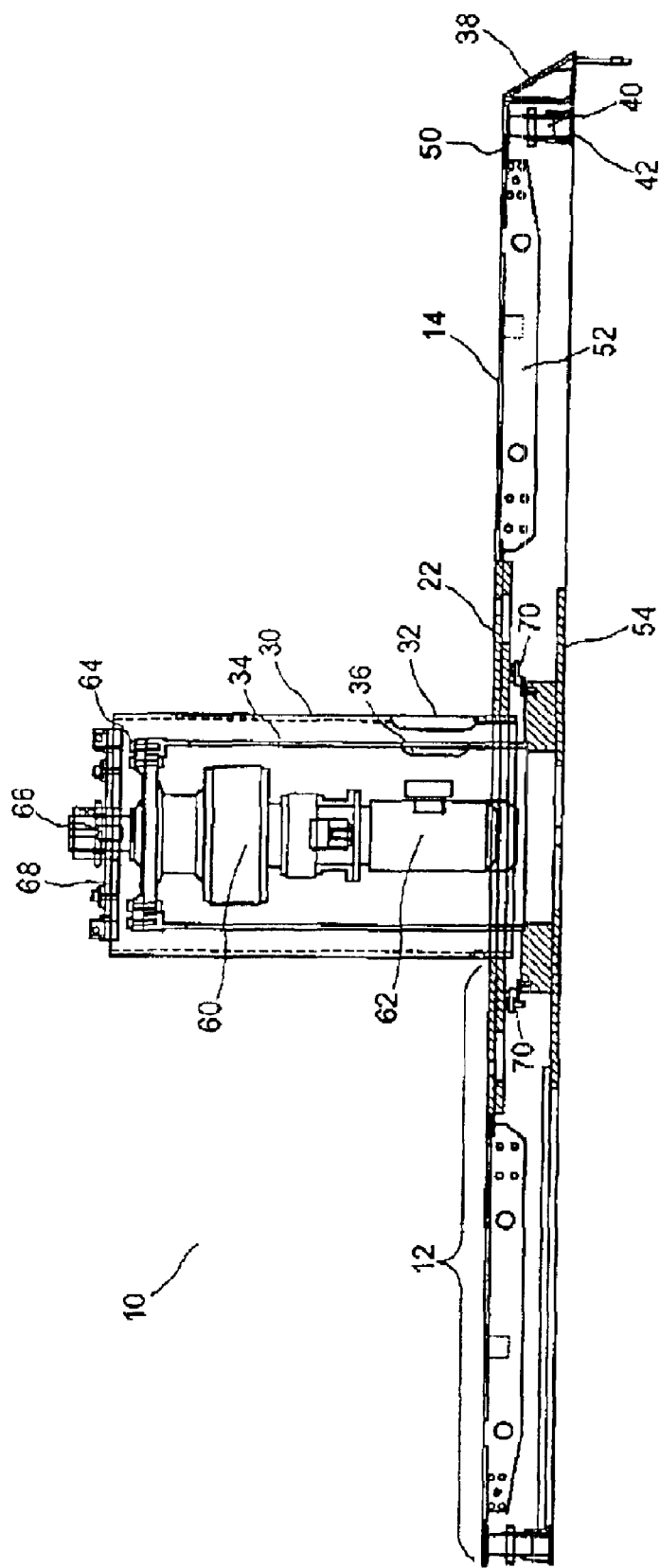
FIG. 3 is a cross-section side plan view of the turntable of FIG. 1.

In FIG. 3, a cross-sectional plan view of turntable 10 is presented. The additional details seen in this view include motor section 60 (including a motor and a gearbox section) which is located within motor support cylinder 34, and is located on the central axis 62 of turntable 10. Motor section 60 is attached to motor support cylinder 34 using brackets 64, and motor support cylinder 34 rests on support base 54. As such, motor section 60, brackets 64, base 54 and motor support cylinder 34 remain stationary when platform 12 is rotated.

Drive shaft 66 extending from motor section 60 is connected to outer vertical cylinder 30 using a flexible misalignment connector 68.

Platform 12 has a diameter of 5 meters, and central support cylinder has a diameter of 1 meter. This results in a turntable where the central support has a footprint of 4% of the total area of the turntable In use, motor section 60 is activated in order to turn turntable platform 12. Drive shaft 66 acts, through brackets 68 to cause central support cylinder 30 to rotate about axis 62. Section 22, which is attached to central support cylinder 30, also rotates, and causes support arms 52 to rotate, which in turn, causes panels 14 and 16 to move as part of platform 12. As such, platform 12 rotates.

Figure 4:
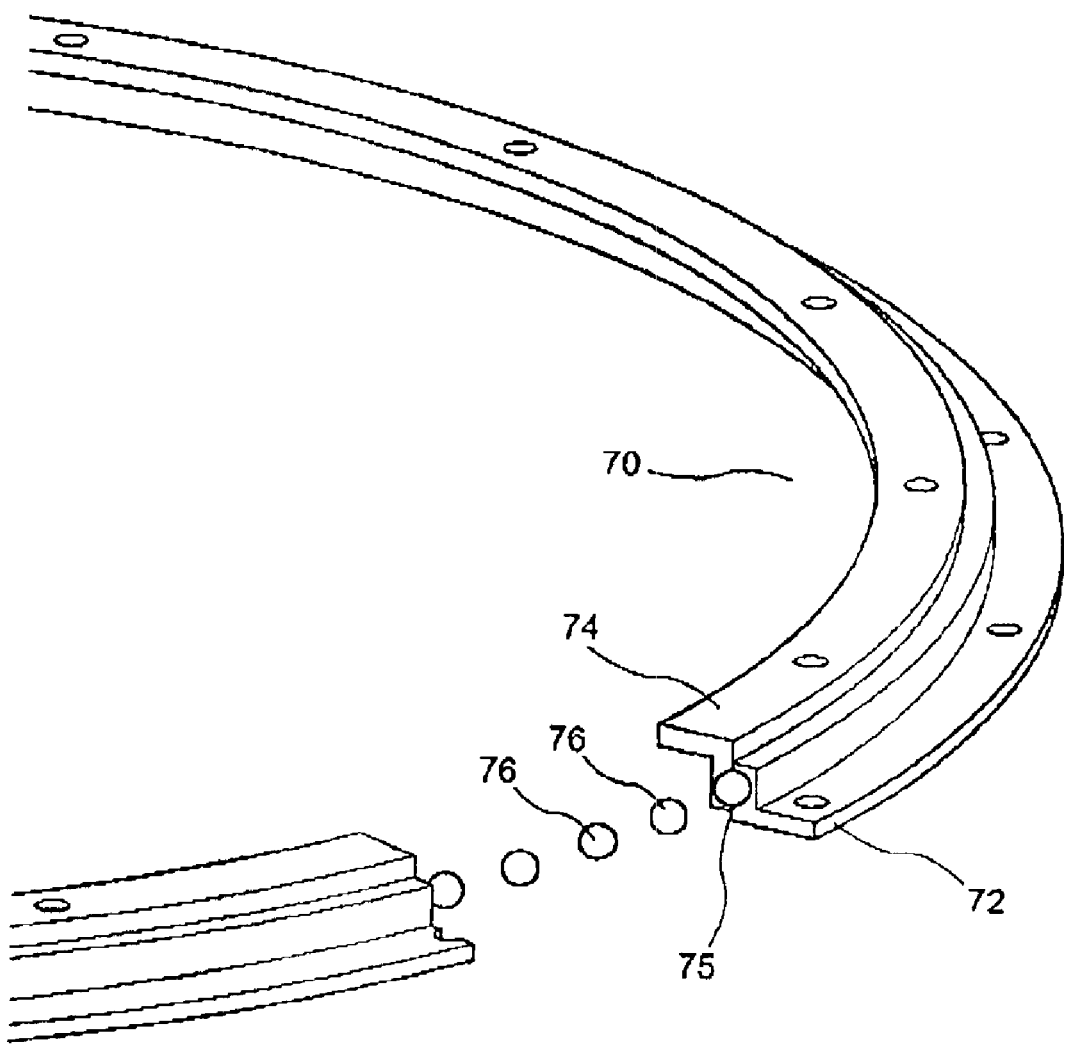
FIG. 4 is an exploded view of a section of the ring bearing.

The outer edge of platform 12 is supported by casters 40. The inner portion of platform 12 is supported by annular ring bearing 70, which is shown in more detail in FIG. 4. Ring bearing 70 has a stationary portion 72 affixed to support base 54, and a movable portion 74 affixed to section 22. Portions 72 and 74 are separated by a series of ball bearings 76 which ride in a track 75 created between the two portions. As such, the inner and outer portions of platform 12 are supported, and in particular, are supported while rotating.

Motor section 60 is contained within a vertical motor support cylinder 30, and is thus protected from accidental damage, but is easily accessible should maintenance or repair be required. Further, the radial design of the panel sections 14 and 16 allows for a minimum number of replacement panels to be kept on site, and the panels can be rapidly changed if required. Further, the uniform size and construction of the panel sections facilitates alignment of the panels on the platform, and thus provides a level platform free from uneven gaps or openings.

Figure 5A:
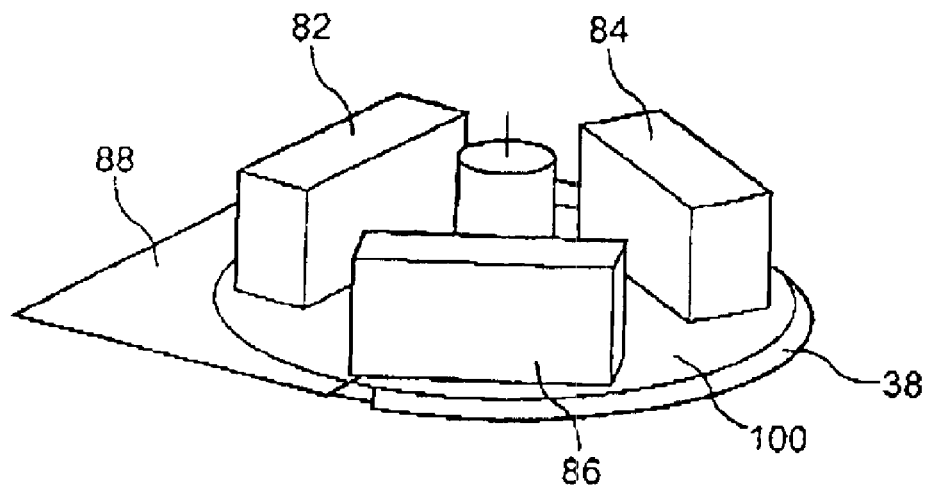
FIG. 5 is a diagrammatic representation of the use of the turntable of FIG. 1.

In FIG. 5, a diagrammatic representation of the use of a turntable 100 according to the present invention is shown. In FIG. 5A, a turntable 100 is shown on which are placed three racks 82, 84 and 86, for a three station configuration. Turntable 100 is made of steel, and has a diameter of 6 meters. Adjacent to turntable 100 is a floor section 88 which is level with the platform 102 of turntable 100. Workers would move from floor section 88 onto platform 102 and fill the contents of rack 82. When rack 82 was filled, turntable 100 would be rotated 120° so that rack 82 would become rack 84. At this point, rack 84 is accessible to a fork lift, not shown, and would be removed from turntable 100. It should be noted that guard 38 is used to prevent the tines of the fork lift from accessing the lower areas of turntable 100. After the full rack 84 has been removed, an empty rack could be placed in its position. After the next 120° turn of the turntable, rack 84 would become rack 86, and would be available as the next rack to be filled on a subsequent turn of the turntable.

Figure 5B:
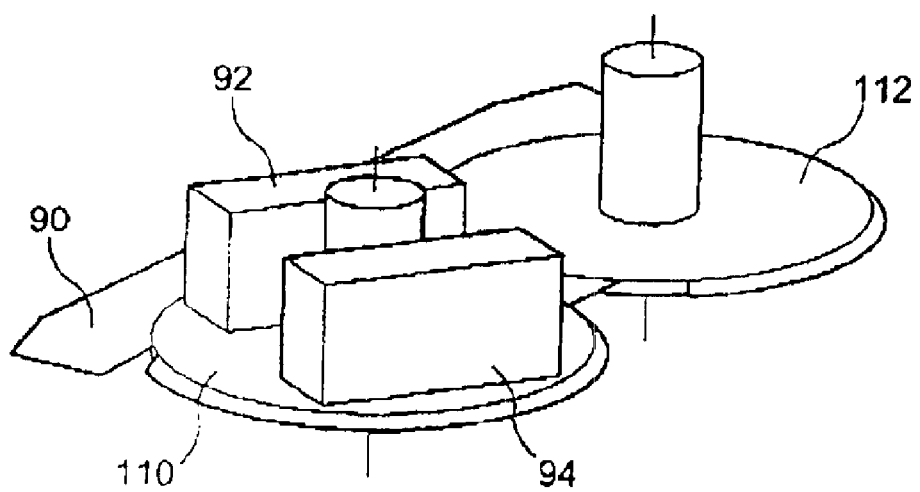

In FIG. 5B, a two station configuration of a turntable 110 is shown with two racks 92 and 94, wherein rack 92 could be filled by workers moving from floor section 90. Turntable 110 is also made of steel, and has a diameter of 5.5 meters. When full, turntable 110 is rotated 180° so that rack 92 becomes rack 94. Rack 94 can be removed from turntable 110 using a fork lift, and replaced with an empty rack. As a result of the turn of the turntable, the empty rack would be moved to the station where the workers could begin filling, so that the empty rack would now become rack 92.

A second turntable 112 is shown adjacent to turntable 110 (in this case, identical to turntable 110), which is used in a production line environment so that the next step of the process could be conducted on turntable 112. As such, the utility of the turntable design has been demonstrated.

Thus, it is apparent that there has been provided, in accordance with the present invention, a turntable for production line applications, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A turntable for production line applications which turntable is rotatable about a central vertical axis, and which comprises:

a platform having an inner edge and an outer edge;

an outer support;

a inner support for supporting said platform at or near said inner edge of said platform, such that said platform is essentially supported by said outer and said inner supports; and a central structure at or near said central vertical axis, comprising a vertical central support which extends above the turntable platform and which is co-axial with the central vertical axis, and to which an inner edge of said platform is attached, a motor support located inside said central support and fixed to a stationary support, a vertical motorized drive section supported by said motor support, and a connector which connects said drive section to said central support.

2. A turntable as claimed in claim 1 wherein said platform is annular in shape and essentially flat.

3. A turntable as claimed in claim 1 wherein said turntable has a diameter of at least 1 meter.

4. A turntable as claimed in claim 3 wherein said turntable has a diameter of between 3 and 10 meters.

5. A turntable as claimed in claim 3 wherein said turntable has a diameter of between 5 and 8 meters.

6. A turntable as claimed in claim 1 wherein the central structure has a footprint which is less than 15% of the total turntable area.

7. A turntable as claimed in claim 6 wherein the central structure has a footprint which is less than 10% of the total turntable area.

8. A turntable as claimed in claim 6 wherein the central structure has a footprint which is less than 5% of the total turntable area.

9. A turntable as claimed in claim 1 wherein said outer support is provided by a plurality of rollers or casters located at or near the outer surface of the turntable.

10. A turntable as claimed in claim 9 wherein said rollers or casters are connected to a caster ring.

11. A turntable as claimed in claim 9 wherein said rollers or casters are individually adjustable in height using a threaded height adjustment.

12. A turntable as claimed in claim 1 wherein said inner support is provided by a ring bearing.

13. A turntable as claimed in claim 1 additionally comprising a sloped guard member around at least part of said platform, which guard is angled upwards so as to deflect the tines of a fork lift upwards.

14. A turntable as claimed in claim 1 wherein said central support is a vertical cylinder.

15. A turntable as claimed in claim 14 wherein said central support is attached at a lower end of the vertical cylinder, to the platform of the turntable so that rotation of the central support results in rotation of the turntable.

16. A turntable as claimed in claim 14 wherein said motor support is a second vertical cylinder located inside said central support and which is also co-axial with the central vertical axis.

17. A turntable as claimed in claim 16 wherein said motor support is directly or indirectly supported by a floor structure.

18. A turntable as claimed in claim 16 wherein said motorized drive section is supported by the motor support, and is essentially contained within the motor support.

19. A turntable as claimed in claim 18 wherein said motorized drive section includes a motor in combination with a gear box, a differential, or a fluid couplings.

20. A turntable as claimed in claim 1 wherein said motorized drive section has an output shaft, and the output shaft of the motor of said motorized drive section is centred on the central axis of said turntable.

21. A turntable as claimed in claim 20 wherein said output shaft is connected to said central support using said connector.

22. A turntable as claimed in claim 21 wherein said connector comprises a flexible, elastomeric, or resilient coupling.

23. A turntable as claimed in claim 22 wherein said coupling is a misalignment coupling which would allow for some small misalignment of the motor output shaft.

24. A turntable as claimed in claim 1 wherein said central structure comprises: i) a central support consisting of an outer vertical cylinder having an upper open end and a lower open end, the edge of said lower open end being affixed to the inner edge of said platform; ii) a motor support consisting of an inner vertical cylinder within said central support having a lower end opening, the edge of which is attached directly or indirectly to said supporting floor structure; iii) a vertically aligned motor as part of said motorized drive section essentially contained within said inner vertical cylinder and connected to said motor support; iv) said connector which connects an output shaft of said motorized drive section to said outer vertical cylinder, wherein rotation of said output shaft of said motorized drive section results in rotation of said outer vertical cylinder, and thus results in rotation of said platform.

25. A turntable as claimed in claim 24 wherein the axis of said motor, a gear section, and/or the output drive shaft from the motor or gear section of said motorized drive section, are all essentially aligned along the central vertical axis of said turntable.

26. A turntable as claimed in claim 1 wherein said platform comprises a plurality of pie-shaped elements connected together, which elements extend radially away from a central annular portion of said platform.

27. A turntable as claimed in claim 26 wherein said pie-shaped elements are essentially identical.

28. A turntable as claimed in claim 27 wherein said pie-shaped elements have a standard radial angle.

29. The use of a turntable as claimed in claim 1 in a production line application.

30. The use of a turntable as claimed in claim 29 wherein said turntable is used in the production of an automobile or in the production of automobile parts.

31. A turntable for production line applications which turntable is rotatable about a central vertical axis, and which comprises:

a platform having an inner edge and an outer edge;

an outer support;

a inner support for supporting said platform at or near said inner edge of said platform, such that said platform is essentially supported by said outer and said inner supports; and a central structure at or near said central vertical axis, comprising a vertical central support to which an inner edge of said platform is attached, a motor support located inside said central support and fixed to a stationary support, a vertical motorized drive section supported by said motor support, and a connector which connects said drive section to said central support and wherein said outer support is provided by a plurality of rollers or casters located at or near the outer surface of the turntable and said rollers or casters are individually adjustable in height using a threaded height adjustment.

* * * * *